(12) United States Patent
Donlagic

(10) Patent No.: US 8,290,323 B2
(45) Date of Patent: *Oct. 16, 2012

(54) MULTIMODE OPTICAL FIBER WITH LOW DIFFERENTIAL MODE DELAY

(75) Inventor: Denis Donlagic, Maribor (SI)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/643,542

(22) Filed: Dec. 21, 2009

(65) Prior Publication Data

US 2010/0098431 A1  Apr. 22, 2010

Related U.S. Application Data

(63) Continuation of application No. 11/658,561, filed as application No. PCT/FI2005/050284 on Jul. 26, 2005, now Pat. No. 7,646,955.

(30) Foreign Application Priority Data

Jul. 26, 2004 (SI) .................................. 200400216
Jun. 27, 2005 (SI) .................................. 200500190

(51) Int. Cl.
G02B 6/028 (2006.01)
(52) U.S. Cl. ...................................................... 385/124
(58) Field of Classification Search .................. 385/124
See application file for complete search history.

(56) References Cited

U.S. PATENT DOCUMENTS

| | | | | |
|---|---|---|---|---|
| 4,184,744 A | | 1/1980 | Onoda et al. | 385/127 |
| 6,990,277 B2 | * | 1/2006 | White | 385/39 |
| 7,006,751 B2 | * | 2/2006 | Provost et al. | 385/141 |
| 7,336,877 B2 | | 2/2008 | Bickham | 385/127 |
| 7,646,955 B2 | * | 1/2010 | Donlagic | 385/124 |
| 2005/0207714 A1 | * | 9/2005 | Koike et al. | 385/124 |

FOREIGN PATENT DOCUMENTS

WO    WO 2004025340 A1 * 3/2004

* cited by examiner

Primary Examiner — Omar Rojas
(74) Attorney, Agent, or Firm — Matthew J. Mason

(57) ABSTRACT

An optical multimode fiber including a graded index core and an extended gradient core which has a negative refractive index difference with respect to the cladding. The fiber improves the bandwidth, reliability and complexity of the telecommunication systems that are based on multimode fibers. The fiber reduces the differential mode delay among modes. The fiber thereby allows achieving large bandwidth even in the case when the highest order modes are excited. This has positive effects to the conditions that need to be fulfilled by the components such as optical sources, connectors, fiber couplers, other optical components, cables, etc. The fiber eliminates negative impact of the cladding that allows for reduction of fiber core size and the difference between the cladding and the core and thereby allows for achieving the larger bandwidth of optical fiber at lower fiber production cost.

5 Claims, 5 Drawing Sheets

MULTIMODE OPTICAL FIBER WITH LOW DIFFERENTIAL MODE DELAY

CROSS-REFERENCE TO RELATED APPLICATIONS

This is a continuation of U.S. patent application Ser. No. 11/658,561, filed Nov. 10, 2008, now U.S. Pat. No. 7,646,955 which claims priority to Slovenian patent application 200400216 filed 26 Jul. 2004 and Slovenian patent application 200500190 filed 27 Jun. 2005 and which is the national phase under 35 U.S.C. §371 of PCT/FI2005/050284 filed 26 Jul. 2005, the content of which is relied upon and incorporated herein by reference in its entirety, and the benefit of priority under 35 U.S.C. §120 is hereby claimed.

BACKGROUND (1) Field of the Invention

This invention relates to multimode optical fiber.

(2) Description of Related Art

The goal of telecommunication industry is in general the highest possible amount of data transfer in shortest possible time. With the ever increasing number of users and complexity of services there exists a daily increase in demand for the amount of data that can be transferred.

In the art there are variety of solutions that can be applied to achieve high data rate transfer over longer distances. Optical communications, that were topic of intense research and development in past 20 years, make it possible to achieve a bandwidth not comparable to other technologies. The solutions that are used today in communications over shorter distances are mainly based on multimode fibers. The advantage of multimode fiber lies mainly in the ability to couple this fiber with simple and more cost effective sources. In the past these sources were mainly LEDs with the wavelength around 850 nm. Lately, low cost laser diodes with a vertical resonator (VCSEL) have appeared in the market that enable effective coupling between optical fibers and they also achieve high modulation rates.

Conventional multimode fiber has been known for over 25 years and is standardized by international standards such as ITU-T G.651. According to the most recent recommendations such as OM3, multimode fibers can achieve bandwidths of up to 1.5 GHz·km when all modes of the fiber are excited. But even when the bandwidth of 1.5 GHz·km is achieved, differential mode delay proved to be still over 1 ns/km, which limits further increase of bandwidth. The development of low cost vertical cavity lasers (VCSEL) has lately resulted in a new concept where laser selectively excites only the lower order modes of optical fiber. This results in lower delay between fastest and the slowest excited modes, that allows for achieving the bandwidths in the excess of 1.5 Gbit·km. This approach has been the topic of intense research that lately resulted in the adoption of IEEE 802.3z and IEEE 802.3ae standards. However, the selective excitation of modes in graded index fiber also brings a range of drawbacks. Optical connectors of insufficient quality, bad splices, certain optical components cabling and process of applying the cables can induce mode coupling between the modes that can result in sudden and unexpected degradation of fiber bandwidth. The systems that base on selective excitation also require more complex field test equipment. In addition the selective excitation of modes requires better and narrower range of tolerances for the components that reduces the cost efficiency of the transmission systems. The potential main drawback of selective excitation of the modes in the future can be the lack of compatibility of such concept with the emerging technology of VCSEL arrays. The VSCEL array is composed of larger number of laser diodes with different wavelengths that are integrated on the same chip. Such configuration can allow for efficient wavelength division multiplexing. VCSEL array can be efficiently coupled to an optical fiber under the condition that the fiber core area in which the light needs to be coupled is sufficiently large. Larger VCSEL array therefore cannot be coupled with the multimode fiber while exciting only a limited number of modes.

There is an oblivious need to have a multimode fiber with large bandwidth even when an arbitrary or entire set of modes is excited.

There exists a variety of systems that enable the increase of bandwidth of multimode fibers. As already described, most of those systems are based on selective excitation of modes in multimode fibers. There are also individual non-standard solutions that are based on selective excitation of the modes as described for example in U.S. Pat. No. 6,580,543 and U.S. Pat. No. 6,330,382. There are solutions that enable archiving the bandwidths over 1.5 GHz·km in an restricted launch but at the same time enable bandwidths over 500 MHz·km while exciting the entire set of modes. Such solutions are presented in U.S. Pat. Nos. 6,434,309, 6,438,303, 6,618,543 and 6,724,965. Dispersion compensation according to U.S. Pat. No. 6,363,195 has also been proposed but its efficiency is limited.

Significant efforts have been also made to develop fiber index profiles that yield high bandwidth to equalize the delay times of high order modes in a multi-mode fiber and to compensate for the center dip. Those efforts were mainly done in the early era of optical fibers. For example in Geshiro et al., "Truncated Parabolic-Index Fiber with Minimum Mode Dispersion," IEEE TRANS. MICROWAVE THEORY AND TECHNIQUES, Vol. MTT-26, No. 2 (February 1978), at p. 115, a parabolic index profile is combined with a cladding jump, which leads to higher bandwidths than with a parabolic profile with no cladding jump. U.S. Pat. No. 6,292,612, discloses MM fiber having a refractive index profile that differs from a conventional α-type profile by at least one of the following: i) a step formed in the index profile at the core/cladding boundary, in conjunction with a linear correction; (ii) a ripple near the core/cladding boundary, in combination with a linear correction, with or without an index step; and iii) an annular ridge formed in the index profile with a center dip. In Stolz and Yevick "Correcting Multimode Fiber Profiles with Differential Mode Delay", J. Optical Communications, vol 4 (1983), no 4 pp. 139-147 trimming of the MMF core edge to reduce the highest order modes differential delay has been proposed.

The idea of reducing the higher order mode delay by extension of graded index core beneath the cladding level was first proposed in K. Okamoto and T. Okoshi, "Analysis of Wave Propagation in Optical Fibers Having Core with a α-Power Refractive-Index Distribution and Uniform Cladding" IEEE Transactions on Microwave Theory and Techniques, 24(7), pp. 416-421, March 1976. In this work the α-profile multimode fiber profile was extended below the cladding level (e.g., outside the core/cladding boundary region), with a negative cladding jump. The supporting analysis demonstrated that the absolute value of negative extension of the α-core beneath the cladding level needs to be approximately of the same depth as the absolute difference between the maximum refractive index of the core at its center and the cladding level. In case of common silica telecommunication multimode fiber with index Δ=1%, such negative refractive index core extension beneath the cladding would need to be approximately −1%. This is a condition that is not technically and economically compatible with current manufacturing techniques for silica-based fibers. However, in plastic optical fiber where negative index differences of the profile with the respect to the cladding are easy to achieve, this approach has been already successfully applied, see T. Ishigure, H., K. Ohdoko, and Y. Koilce, "High-Bandwidth Plastic Optical Fiber With W-Refractive Index Profile", IEEE Photonics Technology Letters, 16 (9), pp. 2081-2083, September 2004. Further efforts were conducted to develop this concept in Katsunari Okamoto and Takanori Okoshi in "Computer-Aided Synthesis of the Optimum Refractive-Index Profile for a Multimode Fiber" IEEE Transactions on Microwave Theory and Techniques, 25(3), pp. 213-221, March 1977. A trial and error algorithm was used to automatically search for an optimum fiber profile shape that includes the extension of the core beneath the cladding level. The result of numerical optimisation was an optimal profile, which is reported to be a smoothed W-shaped profile (e.g., FIG. 1 thereof. This synthesized profile was similar to α-profile fiber in the region with positive relative refractive index difference, however in the region near the edges of the core where the index difference was below the cladding level, the smoothed shape deviating from α-alpha profile was characteristic. The maximum absolute value of the relative index difference of the core extension and the cladding level was still in the best case one half of the absolute difference between the maximum refractive index of the core at its center and the cladding level. In case of standard 50 μm fiber the index maximum relative negative index difference of the profile would need to be below −0.5% while the region would require precise shaping in accordance with the results of numerical optimization process. While such profiles may be advantageous in leading to high bandwidths, they are barely incompatible with the manufacturing process for silica-based fiber. It is know from the literature that achieving negative index difference in silica fiber manufacturing process close or below −0.5% is very difficult and uneconomical, especially if precise control of the profile is required. In addition, it is believed that such profiles may lead to leaky modes as the regions with the negative index difference are deep and wide and provide good isolation of leaky modes from the cladding.

BRIEF SUMMARY

This invention relates to multimode optical fiber that can achieve a bandwidth in excess of 5 GHz·km while exciting an arbitrary set of modes. Such fiber is intended for high speed data communications over shorter distances, but other applications are also possible.

The technical problem solved by the invention is the reduction of differential mode delay that limits the bandwidth of the telecommunication system. The invention presents profile designs of multimode optical fibers, which can achieve a bandwidth of over 5 GHz·km regardless of the excited excited set of modes, including the cases when in a multimode fiber the highest order modes are excited or the entire set of modes is excited.

In the present invention the problem is solved by introduction of special structure in the profile of multimode optical fiber that enables the equalization of the group velocities of higher and lower order modes and is at the same time compatible with current manufacturing processes.

The present invention uses core extension beneath the cladding level to minimize the differential mode delay among the modes. However, the negative index differences are appropriately small to enable practical and economical fiber manufacturing. This is achieved by introduction of depression with negative index of refection relative to the cladding around the extended core. In addition, the entire core of the fiber resembles α or nearly α-profile including the section that extends beneath the cladding level that further simplifies fiber manufacturing and differentiates this invention from current state of the art.

The invention will be described using examples and figures.

DETAILED DESCRIPTION

Detailed numerical analysis has shown that it is not possible to achieve a bandwidth significantly over 1.5 GHz·km when the entire set of modes is excited in a standard multimode fiber. It is generally known that the modal dispersion is minimized by application of the α-profile of the optical fiber that is defined as $$n(r) = n_{max}(1 - 2\Delta(r/a)^{\alpha})^{1/2} \text{ for } r < a$$

and $$n_{max}(1 - 2\Delta)^{1/2} \text{ for } r \geq a$$

where r is a coordinate in the radial direction of a cylindrical optical fiber, a is core radius, n(r) is refractive index of the optical fiber at radius r, $n_{min}$ is the minimum refractive index (in standard fiber this is the refractive index of the cladding), $n_{max}$ is the maximum refractive index of the fiber core, α is a parameter of the profile, and Δ is defined as $$\Delta = (n_{max}^2 - n_{min}^2)/(2n_{max}^2).$$

The profile of standard multimode fibers is composed of a graded index core that is defined by upper equation that describes α-profile of the optical fiber and cladding with the constant refractive index $n_{min}$. The α-parameter of the profile is around the value of 2, depending on the wavelength for which the fiber is optimized.

Figure 1:
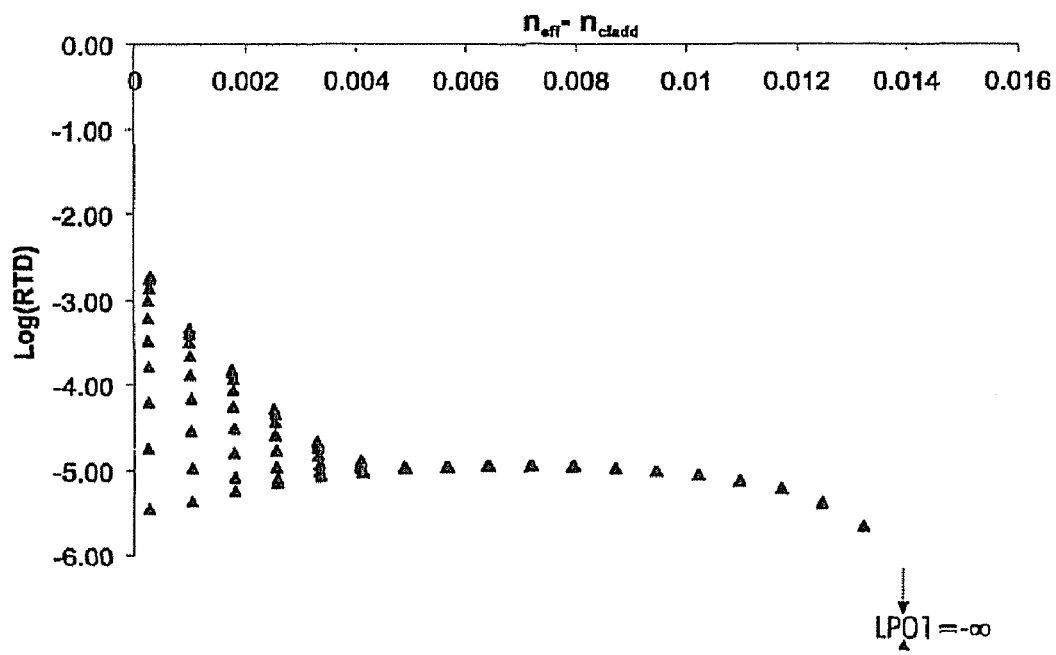
FIG. 1 shows the logarithm of relative time delay (RTD) in standard 50 μm optical fiber at the wavelength of 850 nm. Each dot in the figure presents one linearly polarized mode. Many dots are overlapping.
Figure 2:
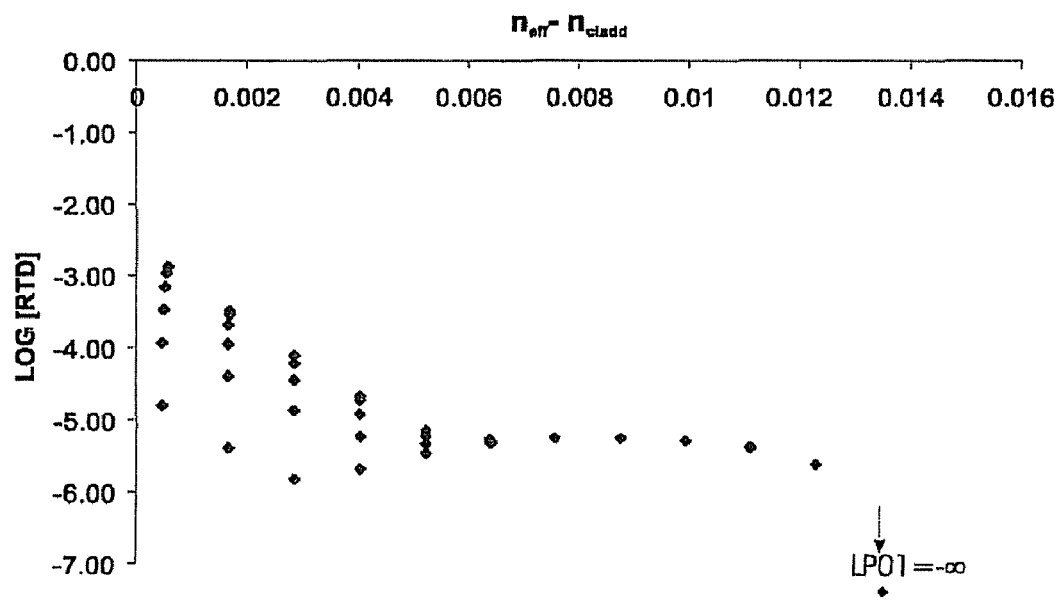
FIG. 2 shows the logarithm of relative time delay (RTD) in standard 50 μm optical fiber at the wavelength of 1310 nm. Each dot in the figure presents one linearly polarized mode. Many dots are overlapping.

The detailed numerical analysis showed that the conventional α-profile does not allow for minimization of highest order mode group delays when compared to the lower order modes, as shown in FIGS. 1 and 2. FIGS. 1 and 2 represent the logarithm of relative time delay (RTD) as a function of difference between the effective indices of the modes and cladding level. The RTD is defined as:

RTD=|group delay of the fundamental mode−group delay of the observed higher order mode|/group delay of the observed higher order mode.

FIGS. 1 and 2 show that the delays of the highest order modes are significantly larger when compared to delays of the lower order modes, which results in pronounced modal dispersion and thereby limits the bandwidth of the optical fiber when higher order modes are excited. Large delays are the consequence of negative impact of the cladding with the constant refractive index of refraction on the propagation of the higher order modes. In fact, a significant portion of the evanescent field of the highest order modes propagates in the cladding where effect of the group velocity equalization, provided by the graded index core is not present.

Figure 3:
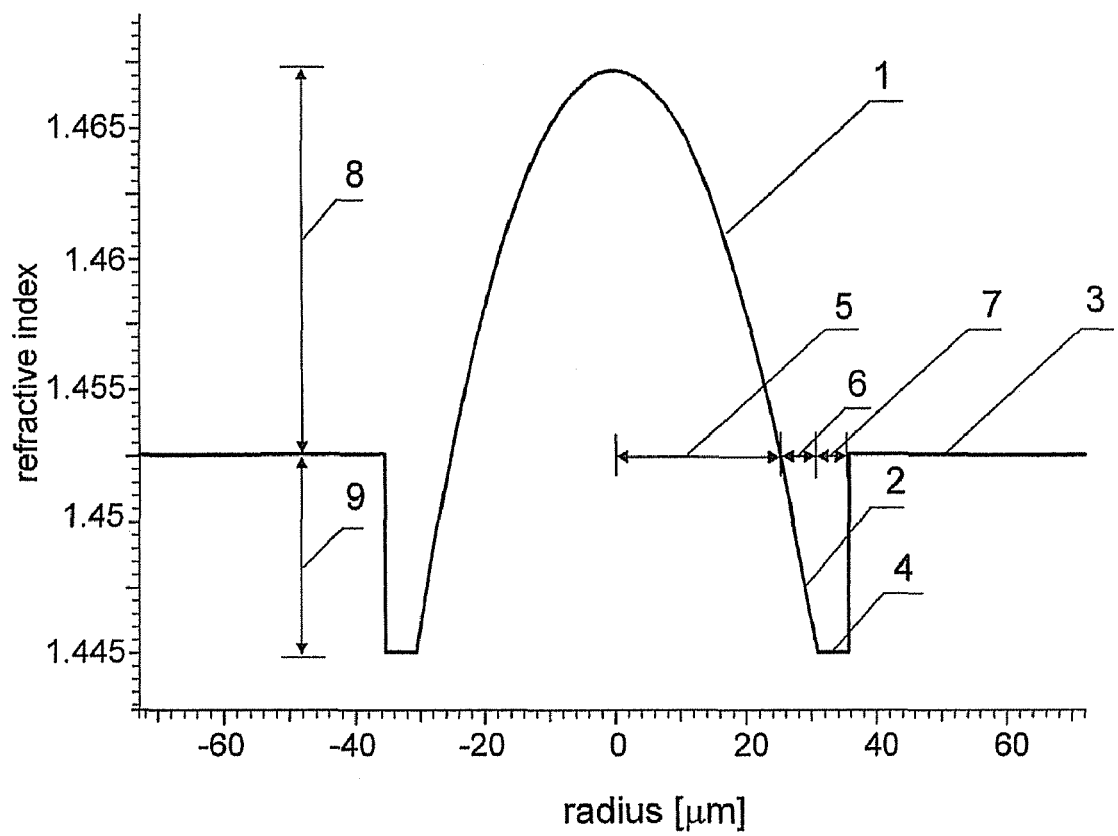
FIG. 3 shows an example of an improved profile with the definition of depressed extended core and depression.

The presented invention solves the problem of negative impact of the cladding in accordance with FIG. 3 in a way to introduce into the known multimode fiber profile that is composed of core 1 with radius a 5 and reflection index difference $\Delta_1$ 8 and cladding 3, additional profile structures:

a) depressed extended core 2 with radial dimension b 6 and relative refractive index difference $\Delta_2$ 9 with respect to the cladding 3 that is a continuation of the primary core 1 with α-profile.

b) depression 4 with radial dimension c 7 and relative refractive index difference $\Delta_2$ 9 with the respect to the cladding 3, which encircles the extended core.

Figure 4:
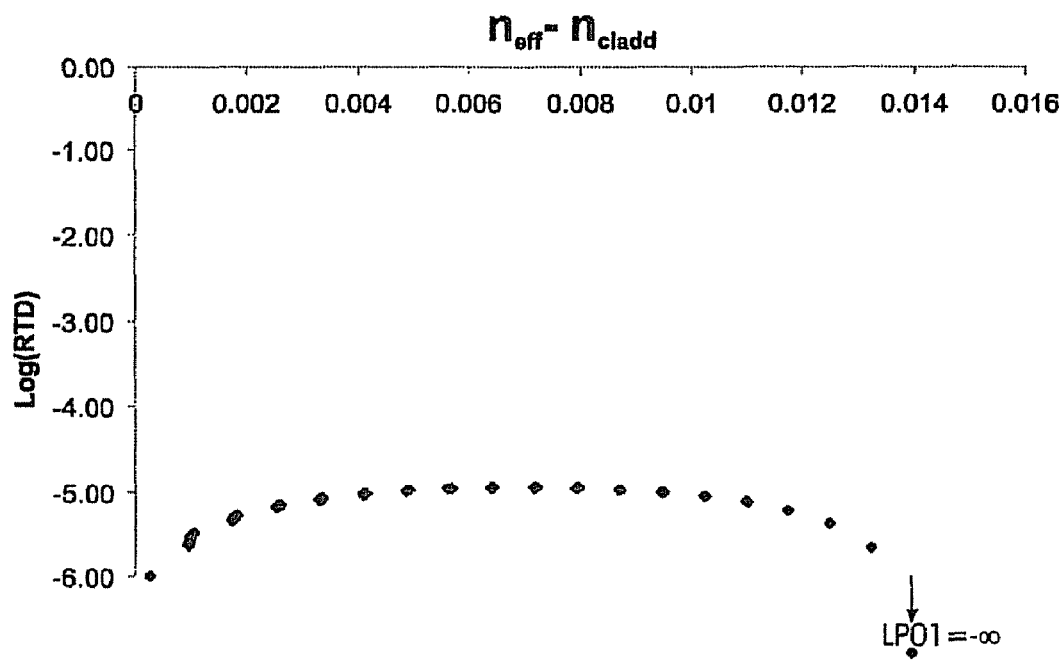
FIG. 4 shows logarithm of relative time delay (RTD) in improved 50 μm optical fiber at the wavelength of 850 nm. Each dot in the figure presents one linearly polarized mode. Many dots are overlapping.
Figure 5:
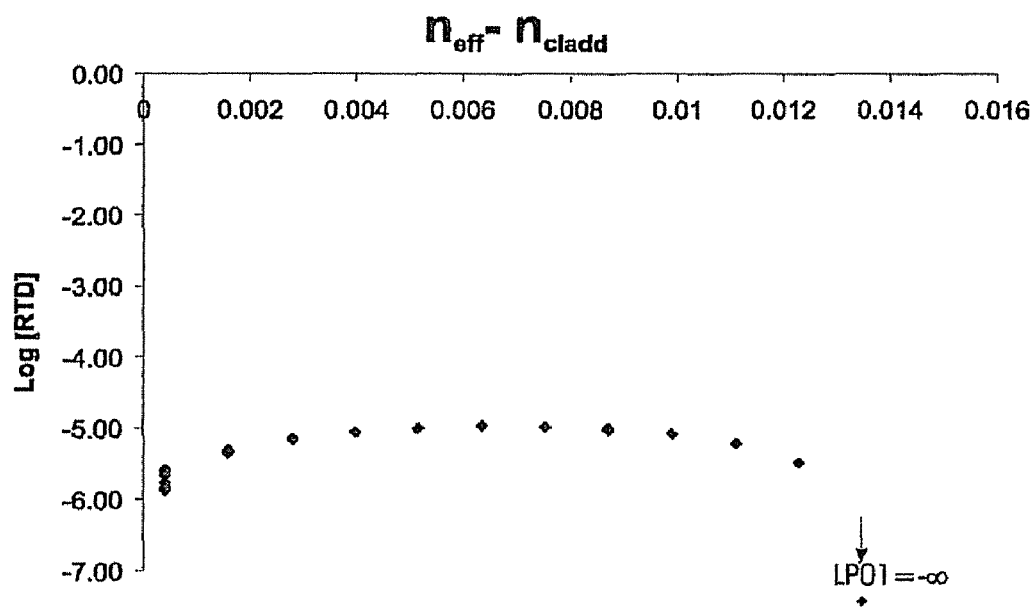
FIG. 5 shows the logarithm of relative time delay (RTD) in improved 50 μm optical fiber at the wavelength of 1310 nm. Each dot in the figure presents one linearly polarized mode. Many dots are overlapping.

The introduced profile structures have two effects: the major fractions of the evanescent highest order modal fields propagate in the extended depressed core 2, that has α-profile shape and thereby enables good equalization of group velocities of highest order modes, and assures better confinement of the highest order modal fields to the main core 1 and extended core 2. The final effect is such that the fraction of the evanescent field of the highest order modes that propagate in the cladding with the constant index of refraction 3 becomes negligible. This enables very good equalization of group velocities of higher order modes as shown in FIGS. 4 and 5. Both figures clearly show significant reduction (improvement) of relative delay between modes when compared to FIGS. 1 and 2. The set of parameters for depressed extended core 2 and index depression 4, that allows for equalization of group velocities is broad and wavelength depended. For the practical manufacturability of the fibers, the minimal dimensions of both profile features are important. Larger extended core 2 requires smaller dimensions of the depression 4 and vice versa. In an extreme case the depression 4 can be omitted, but in such a case the size and depth of the extended core 2 increases to the level impractical for fiber manufacturability.

Figure 6:
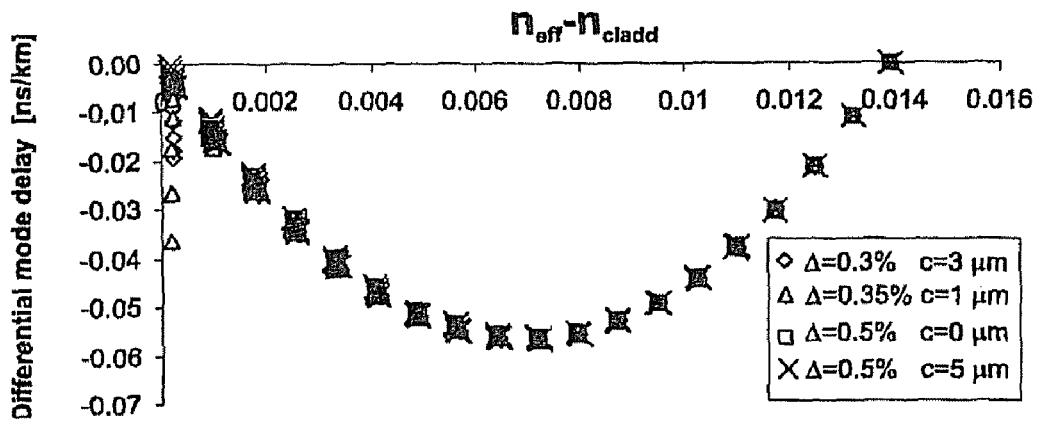
FIG. 6 shows absolute delay in improved 50 μm optical fiber at 850 nm for different profile parameters. Each dot in the figure presents one linearly polarized mode. Many dots are overlapping.
Figure 7:
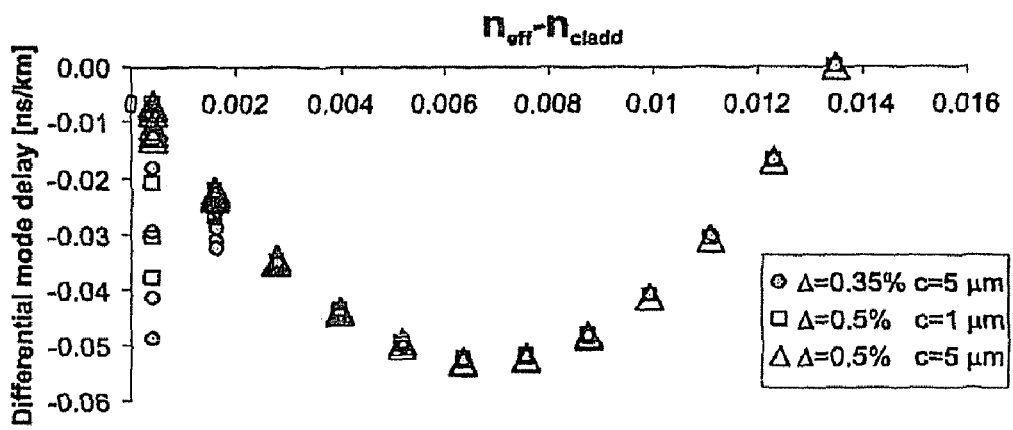
FIG. 7 shows absolute delay in improved 50 μm optical fiber at 1310 nm for different profile parameters. Each dot in the figure presents one linearly polarized mode. Many dots are overlapping.

FIGS. 6 and 7 present absolute delays between individual modal groups for the case of fiber with following parameters: 2a=50 µm, $\Delta_1$=1%, $\Delta_2$=−0.5%, b=5.5, c=5 µm and α=2.087 at 850 nm and α=2.0 at 1310 nm. FIGS. 6 and 7 clearly show that the largest modal delays between the modes do not exceed 0.057 ns/km at 850 nm and 0.053 ns/km at 1310 nm. Achieving the bandwidths in excess of 10 GHz·km is therefore possible even when all modes of the fiber are excited.

A systematic numerical investigation was carried out to determine practical and minimal radial dimensions of b (in FIG. 3 marked by 6) of the extended core, radial dimensions c (in FIG. 3 marked by 9) that enable effective elimination of the cladding influence and thereby minimization of modal dispersion. Table 1 demonstrates practically determined fiber profile parameters that limit the modal dispersion caused by cladding influence below the theoretical value that is achievable with an ideal α-profile fiber with the core size of 2a=50 µm and $\Delta_1$=1%. As can be seen from Table 1, in each instance, the absolute value of $\Delta_1$ (i.e., $|\Delta_1|$) was at least two times the absolute value of $\Delta_2$ (i.e., $|\Delta_2|$) such that $|\Delta_1|/|\Delta_2| \geq 2$.

TABLE 1

|  | 850 nm | 1310 nm |
| --- | --- | --- |
| $\Delta_2$ = −0.3% | b = 4.4 µm, c = 3 µm | — |
| $\Delta_2$ = −0.35% | b = 4.9 µm, c = 1 µm | b = 4 µm, c = 5 µm |
| $\Delta_2$ = −0.5% | b = 5.35 µm, c = 0 µm | b = 5.5 µm, c = 1 µm |

The successful control over the cladding influences enables further reduction of fiber core size a and $\Delta_1$ below the values that are typical for standard fibers. In case where only the core size a and $\Delta_1$ would be reduced, without eliminating the cladding influence, the fiber would not have significantly better bandwidth than is currently available by standard fibers. The introduction of extended depressed core 2 and depression 4 therefore allows for reduction of the radius a of the core 1 and the refractive index difference $\Delta_1$ that is reflected in an bandwidth increase and lowering of fiber production cost. The reduction of $\Delta_1$ namely reduces the contents of germanium, that is the most expensive material in multimode fiber production. In order to maintain sufficient resistance of such fiber to bend losses, the reduced core fiber needs to have appropriate profile parameters that enable sufficient separation of the modal groups in the phase constant space. The differences between effective indexes of refraction for neighboring modal groups shall be as large as in standard multimode fibers. In practice this means that the difference between effective indexes between modal groups shall be around 0.001 at the wavelength of 1310 nm and 0.0007 at the wavelength of 850 nm. The practical examples of profile parameters for such fibers with the radius of a=19 µm and a=15 µm are shown in table 2.

TABLE 2

| | 850 nm | | | | 1310 nm | | | |
| --- | --- | --- | --- | --- | --- | --- | --- | --- |
| Core | α | $\Delta_2$ [%] | b [µm] | c [µm] | α | $\Delta_2$ [%] | b [µm] | c [µm] |
| a = 15 µm, $\Delta_1$ = 0.36% | 2.1027 | −0.25 | 4.24 | 3 | 2.015 | −0.4 | 6.7 | 5 |
| a = 19 µm, $\Delta_1$ = 0.578% | 2.0965 | −0.35 | 4.81 | 3 | 2.01 | −0.45 | 6.27 | 5 |

In spite of the reduced core size, the presented fibers can be effectively coupled to existing VCSEL.

Figure 8:
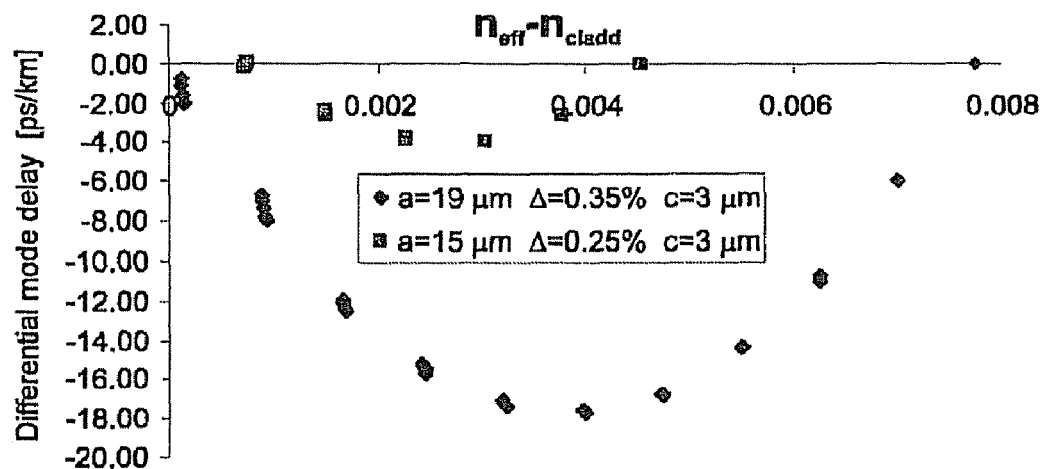
FIG. 8 shows absolute delay in reduced core optical fibers at 850 nm for different profile parameters. Each dot in the figure presents one linearly polarized mode. Many dots are overlapping.
Figure 9:
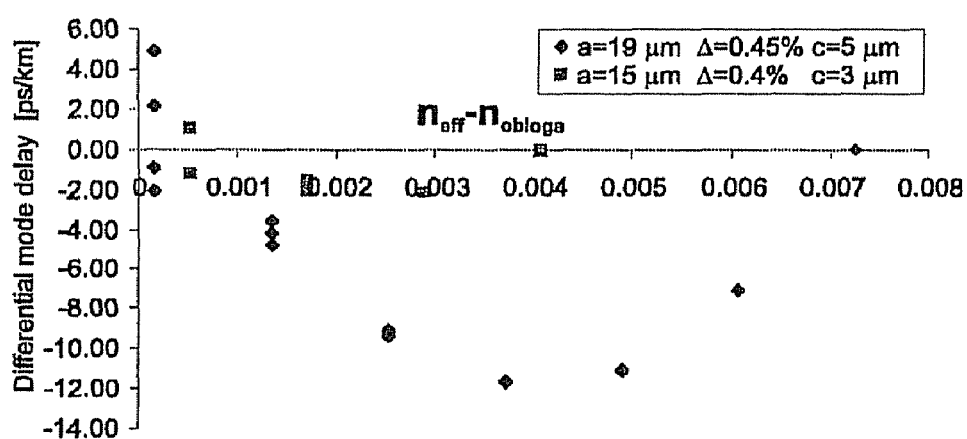
FIG. 9 shows absolute delay in reduced core optical fibers at 1310 nm for different profile parameters. Each dot in figure presents one linearly polarized mode. Many dots are overlapping.

The core radius reduction a and $\Delta_1$ is reflected in significant increase of bandwidth as shown in FIGS. 8 and 9. The maximum delay between the slowest and the fastest mode is for the 19 µm fiber less than 18 ps/km and less than 5 ps/km for the fiber with a=15 μm. This makes it possible to achieve a theoretical bandwidth of 50 to 100 GHz·km.

To an expert in art of optical fibers it is clear that the values of parameters presented in the tables 1 and 2 present only typical examples and variations of these parameters can be found that will provide similar or equal performances that where shown in presented practical examples.

What is claimed is:

1. A multimode optical fiber, comprising:
    a graded index core having a radius at its outermost extent of greater than 23 μm and smaller than 33 μm, a first relative refractive index difference $\Delta_1$ between the core center and a cladding being greater than 0.9%;
    a depression surrounding said outermost extent of said graded index core, the depression having a second relative refractive index difference $\Delta_2$, the refractive index of said depression being lower than the refractive index of the cladding, wherein $|\Delta_1|/|\Delta_2| \geq 2$; and
    the cladding immediately surrounding said depression.

2. The multimode optical fiber according to claim 1, wherein said graded index core has an α-profile extending to said outermost extent and having, at said outermost extent, a refractive index that is lower than the refractive index of the cladding.

3. The multimode optical fiber according to claim 2, wherein said second relative refractive index difference $\Delta_2$ has a negative value between −0.45% and −0.1%.

4. The multimode optical fiber according to claim 3, wherein said radius a, said first relative refractive index difference $\Delta_1$, said second relative refractive index difference $\Delta_2$, and the parameter α of said α-profile have been selected such that the maximum differential group delay between the fastest and the slowest guided mode is smaller than 0.5 ns/km.

5. The multimode optical fiber according to claim 3, wherein said radius a, said first relative refractive index difference $\Delta_1$, said second relative refractive index difference $\Delta_2$, and the parameter α of said α-profile have been selected such that the difference between the effective indices of the neighboring modal groups is at least 0.001 at the wavelength of 1310 nm and at least 0.0007 at the wavelength of 850 nm.

* * * * *